(12) United States Patent
Bar-on et al.

(10) Patent No.: US 11,720,857 B2
(45) Date of Patent: Aug. 8, 2023

(54) AUTONOMOUS SUGGESTION OF ISSUE REQUEST CONTENT IN AN ISSUE TRACKING SYSTEM

(71) Applicants: Atlassian Pty. Ltd., Sydney (AU); Atlassian Inc., San Francisco, CA (US)

(72) Inventors: Noam Bar-on, San Francisco, CA (US); Sukho Chung, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 1115 days.

(21) Appl. No.: 16/370,605

(22) Filed: Mar. 29, 2019

(65) Prior Publication Data
US 2020/0210955 A1    Jul. 2, 2020

Related U.S. Application Data

(60) Provisional application No. 62/786,235, filed on Dec. 28, 2018.

(51) Int. Cl.
| | | |
|---|---|---|
| *G06Q 10/10* | (2023.01) | |
| *G06F 8/70* | (2018.01) | |
| *G06Q 10/06* | (2023.01) | |
| *G06F 40/35* | (2020.01) | |
| *G06Q 10/0631* | (2023.01) | |

(52) U.S. Cl.
CPC .......... *G06Q 10/103* (2013.01); *G06F 8/70* (2013.01); *G06F 40/35* (2020.01); *G06Q 10/06316* (2013.01)

(58) Field of Classification Search
CPC .. G06Q 10/103; G06Q 10/06316; G06F 8/70; G06F 40/35
See application file for complete search history.

(56) References Cited

U.S. PATENT DOCUMENTS 9,008,696 B1 * 4/2015 Beattie ............... H04L 67/18
 340/572.1
9,459,950 B2 * 10/2016 Bhamidipaty ...... G06F 3/04842
(Continued)

FOREIGN PATENT DOCUMENTS

CN 101390085 A * 3/2009 ............ G06F 21/10
CN 105184692 A * 12/2015
(Continued)

OTHER PUBLICATIONS

JYC Chen, "Human performance issues and user interface design for teleoperated robots", 2007, IEEE, pp. 1231-1245. (Year: 2007).*
(Continued)

*Primary Examiner* — Tan D Nguyen
(74) *Attorney, Agent, or Firm* — Brownstein Hyatt Farber Schreck, LLP

(57) ABSTRACT

An issue tracking system configured to determine similarity between issue content items (e.g., title, type, description, and the like). Based on a determined similarity satisfying a threshold and/or using a predictive model, the issue tracking system may provide a user with a suggested supplemental content item to be submitted to the issue tracking system.

20 Claims, 7 Drawing Sheets

(56) References Cited

U.S. PATENT DOCUMENTS

| | | | | |
|---|---|---|---|---|
| 2001/0032092 A1* | 10/2001 | Calver | ............... | G06Q 30/0601 |
| | | | | 705/26.1 |
| 2001/0034015 A1* | 10/2001 | Raichur | ................... | G09B 7/02 |
| | | | | 434/322 |
| 2003/0028448 A1* | 2/2003 | Joseph | ............... | G06Q 30/0623 |
| | | | | 705/304 |
| 2010/0198755 A1* | 8/2010 | Soll | ........................ | G16H 40/20 |
| | | | | 706/11 |
| 2016/0196615 A1* | 7/2016 | Yen | ...................... | H04W 12/12 |
| | | | | 705/30 |
| 2019/0066243 A1* | 2/2019 | Watkins, Jr. | ....... | G06Q 10/0639 |
| 2019/0349320 A1* | 11/2019 | Karuppusamy | ......... | H04L 51/02 |

FOREIGN PATENT DOCUMENTS

| | | | | |
|---|---|---|---|---|
| CN | 106330665 A | * | 1/2017 | |
| CN | 107957991 A | * | 4/2018 | ........... G06F 40/279 |
| JP | 2016110228 A | * | 6/2016 | |
| WO | WO-2018113578 A1 | * | 6/2018 | ......... G06K 17/0025 |

OTHER PUBLICATIONS

Brockett, Patrick, "Fraud Classification Using Principal Component Analysis of RIDITs", 2002, Journal of Risk and Insurance, vol. 69, Issue 3, pp. 341-371. (Year: 2002).*

Umut Ozertem, "Learning to Suggest: A Machine Learning Framework for Ranking Query Suggestions," 2012, SIGIR'12, Aug. 12-16, 2012, pp. 25-34. (Year: 2012).*

Guy Shani, "An MDP-Based Recommender System", 2005, Journal of Machine Learning Research 6, pp. 1265-1295. (Year: 2005).*

Umut Ozertem, "Learning to Suggest: A Machine Learning Framework for Ranking Query Suggestions", Aug. 12, 2012, SIGIR'12, pp. 25-34. (Year: 2012).*

Daniel Zelazo, "Edge Agreement: Graph Theoretic-Performance Bounds and Passivity Analysis," Mar. 2011, IEEE Transactions on Automatic Control, vol. 56, No. 3, pp. 544-555. (Year: 2011).*

* cited by examiner

AUTONOMOUS SUGGESTION OF ISSUE REQUEST CONTENT IN AN ISSUE TRACKING SYSTEM

CROSS-REFERENCE TO RELATED APPLICATIONS

This application is a nonprovisional of and claims the benefit under 35 U.S.C. § 119(e) of U.S. Provisional Patent Application No. 62/786,235, filed on Dec. 28, 2018, and entitled "Autonomous Suggestion of Issue Request Content in an Issue Tracking System," the contents of which are incorporated by reference as if fully disclosed herein.

TECHNICAL FIELD

Embodiments described herein relate to issue tracking systems and, in particular, to systems and processes for suggesting issue request content to a user of an issue tracking system.

BACKGROUND

An organization or individual can leverage an issue tracking system to document and monitor completion of work related to a project or goal. In many cases, however, processes of adding, editing, and/or otherwise updating issues tracked in a conventional issue tracking system may be unnecessarily time and resource consuming. For example, users of an issue tracking system may be periodically or regularly required to input duplicate or substantially identical data multiple times.

SUMMARY

Embodiments described generally reference an issue tracking system. The issue tracking system includes a client device configured to execute a client application. The issue tracking system also includes a host service operably coupled to the client application of the client device. The host service further includes a processor configured to: receive from the client application a first issue request content item; determine a second issue request content item correlated with the first issue request content item; and transmit a suggestion based on the second issue request content item to the client application.

Some example embodiments are directed to a networked issue tracking system for tracking issue records and suggesting content to a user. The networked issue tracking system may include a client device executing a client application that provides a graphical user interface, and a host service communicably coupled to the client application of the client device over a network. The host service may include a processor configured to perform the various functions of the host service. The host service may receive, from the client application, a first content item extracted from a first issue request field of the graphical user interface. A first issue type may be determined based at least in part on the first content item. The host service may also identify (using a predictive model) a second issue record stored by the host service based on the second issue record having a second issue type that corresponds to the first issue type and having at least one content item that corresponds to content extracted from the first issue request. The host service may extract a second content item from the second issue record, and transmit a suggested content item that is based on the second content item to the client application, the suggested content item being entered into a field of the first issue request interface.

In some cases, the first issue request field is a description field that contains a description of a first issue to be addressed by the first issue request. The processor of the host service may be further configured to analyze the description of the first issue request to determine a statistical likelihood that the description indicates either a positive sentiment or a negative sentiment. In response to the analysis of the description indicating a negative sentiment, it may be determined that the issue type is a bug report that relates to a software problem to be fixed. In response to the analysis of the description indicating a positive sentiment, it may be determined, that the issue type is a user story issue type that relates to a software function to be added or enhanced to a software program. The host service may determine the statistical likelihood that the description indicates either a positive sentiment or a negative sentiment by performing one or more of: subjectivity term identification; objectivity term identification; textual feature extraction; or lemmatized word polarity tagging.

In some cases, the host service is further configured to determine an assignee based on content extracted from the first issue request. The assignee may relate to a software development team that is responsible for the issue request. The assignee may be transmitted to the client application and entered into an assignee field of the first issue request interface.

In some cases, the host service is further configured to determine an issue complexity based on content extracted from the first issue request, and the host service may be configured to determine a time estimate based on the issue complexity. In some cases, the issue complexity is determined, in part, based on a complexity of the second issue record.

In some implementations, the host service is configured to receive a first issue complexity from the client device. The host service may also be configured to determine an estimated issue complexity based on a set of issue complexities associated with a set of issue records stored by the host service. The host service may be configured to transmit the estimated issue complexity to the client device.

Some example embodiments are directed to a computer-implemented method of suggesting issue content to a user of a networked issue tracking system. The computer-implemented method may include: causing a display of a graphical user interface on a client device running a client application of the issue tracking system; extracting a first content item from a first issue request field of the graphical user interface; transmitting the first content item from the client device to a host service; determining a first issue type based, at least in part, on the first content item; identifying a second issue record stored by the host service based on the second issue record having a second issue type that corresponds to the first issue type and having at least one content item that corresponds to content extracted from the first issue request; and extracting a second content item from the second issue record. The method may also include transmitting a suggested content item that is based on the second content item to the client application; and causing a display of the suggested content item into a field of the first issue request interface. In some cases, the first issue type is one of: a bug report, a user story, an epic story, or an initiative. The first issue type may be determined based on a sentiment analysis of at least the first content item. In response to the sentiment analysis indicating a positive sentiment, the first issue type is determined to be a user story, epic story, or initiative. In response to the sentiment analysis indicating a negative sentiment, the first issue type is determined to be a bug report.

In some cases, an assignee is determined based, at least in part, on the issue type and a project description extracted from the graphical user interface.

In some implementations, a set of issue records that are associated with the assignee are identified. A complexity estimate may be determined based, at least in part on the set of issue records. One or more of: the complexity estimate or a time estimate that is based on the complexity estimate may be transmitted to the user or client device. The system may cause the display of one or more of: the complexity estimate or the time estimate on the client device.

In some implementations, a first time estimate or first complexity estimate is received from the client device. A set of issue records that correspond to the first issue request may be identified. A modified complexity estimate may be determined based, at least in part on the set of issue records and the first time estimate. The system may cause the transmission of one or more of: the modified complexity estimate or a modified time estimate that is based on the modified complexity estimate to the user or client device. The system may also cause the display of one or more of: the modified complexity estimate or the modified time estimate on the user or client device.

Some example embodiments are directed to a networked issue tracking system for tracking issue records and providing suggested issue content to a user. The networked issue tracking system may include a client device executing a client application of the issue tracking system, the client application providing graphical user interface for receiving a first issue request. The graphical user interface may include: an issue type field, an issue description field; and a time or complexity index field. The networked issue tracking system may also include a host service communicably coupled to the client application of the client device over a network. The host service may be configured to: receive from the client application a first issue description extracted from the issue description field; using a predictive model constructed from a data set that includes previously submitted issue requests and previously stored issue records, identify a second issue record having a second issue description and a second time or complexity index; determine a predicted complexity index based, at least in part, on the second complexity index and the first issue description; and cause the display of the predicted time or complexity index on the graphical user interface of the client device.

In some cases, the predicted time or complexity index is determined based, at least in part on, a first issue type extracted from the issue type field. In some cases, the predictive model includes a regression analysis performed on data extracted from the previously submitted issue requests and previously stored issue records. The regression may be used to determine the predicted complexity index. The regression may be used to determine an issue type.

BRIEF DESCRIPTION OF THE DRAWINGS

Reference will now be made to representative embodiments illustrated in the accompanying figures. It should be understood that the following descriptions are not intended to limit this disclosure to one included embodiment, to the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
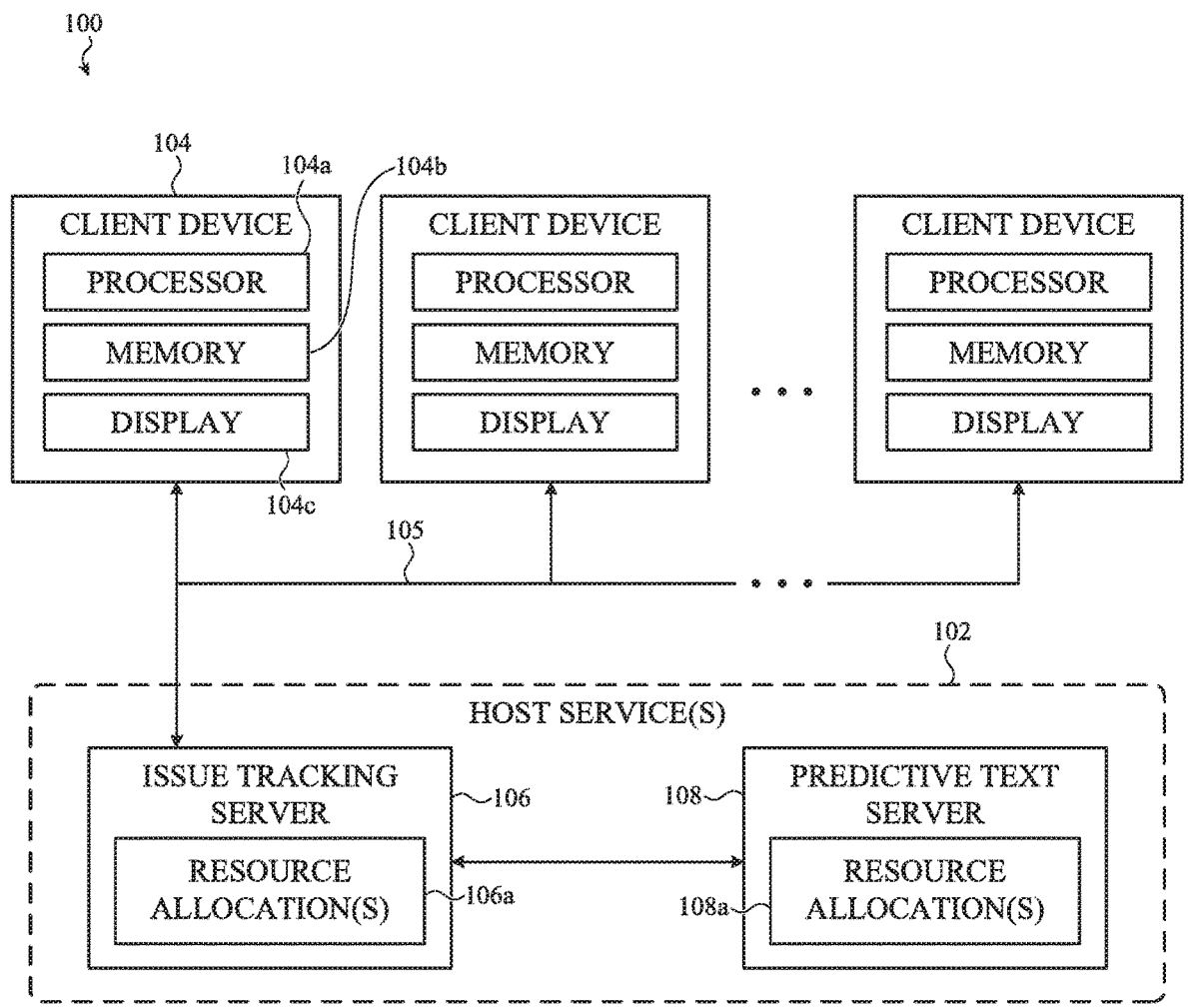
FIG. 1 is a schematic representation of an issue tracking system, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and may not necessarily be presented or illustrated to scale, and are not intended to indicate any preference or requirement for an illustrated embodiment to the exclusion of embodiments described with reference thereto.

DETAILED DESCRIPTION

Embodiments described herein reference systems and methods for suggesting content to a user that is currently interacting with an issue tracking system to populate content (e.g., issue types, complexities, categories, grouping, time estimations, and the like) of a ticket or issue request for that issue tracking system. The systems and methods described herein may be particularly useful for preventing incomplete and/or incorrectly populated issue requests from being received and/or tracked by an issue tracking system.

In some instances, as described herein, the embodiments may be directed to systems and methods of identifying and extracting suggested content from a set of previously stored issue records using a predictive model or other similar technique. In some cases, the system is configured to determine a statistical likelihood that partial content of an un-submitted issue request is related to content(s) of one or more previously submitted issue records stored by an issue tracking system. If the determined likelihood satisfies a threshold, the system provides a suggestion to that user to add, change, or modify content of the un-submitted issue request. The content suggested to the user can be any suitable content including, but not limited to: an issue type (e.g., bug report, user story, epic, initiative and the like); an issue title or one or more words or phrases for an issue title; an issue complexity; an issue completion time estimation; one or more words or phrases to include in an issue description; and the like.

An issue tracking system, as described herein, may be used to refer to a project management tool that may be specially configured for tracking issues and tasks that are associated with a software development project. As described herein, an issue tracking system may be used to refer to a project management tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal. In many examples, an issue tracking system is configured for use by a software development team to track completion and assignment of discrete tasks related to software development projects from creation of new user stories (e.g., user-perspective feature requests or desired functionality), through proof of concept testing, through integration testing, through release of software to one or more users, and through reporting and fixing of software errors (e.g., bugs or software bugs). In other cases, an issue tracking system can be configured for non-software tracking purposes, such as for use by a human resources team, an information technology support group, and so on.

An issue tracking system, as described herein, may increase the efficiency of a team of individuals working on a common goal or project by facilitating the organization of the assignment of discrete items of work to the individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to investigate or implement a user story (e.g., a desired function or feature), a task to perform a feasibility assessment for implementation of a new feature; a task to fix an identified software bug; and so on.

For purposes of the following disclosure, the terms "issue," and "ticket" may be used to generally refer to a task, assignment, goal, or other item that is being tracked by the system. The term "issue request" is generally used to describe an input provided by a user to an issue tracking system that, once submitted to that system, may result in a creation of an "issue record." As used herein, the term "issue record" refers to one or more discrete database records associated with an issue being tracked by an issue tracking system. Although not required, an issue record can be stored, at least temporarily, in a database accessible to an issue tracking system. While these terms are used herein with respect to specific examples and potential implementations, it may be appreciated that these are merely examples and other embodiments can be configured to receive, anticipate, predict and/or recommend additional or alternative data, user inputs, or issue requests or issue records associated with an issue tracking system.

An issue tracking system, as described herein, can be initially configured to monitor, track, or otherwise analyze issue record content in order to train or update a predictive text model configured to ascertain one or more statistically significant relationships (herein, simply, "correlations") between different contents of an issue record or issue record request. The predictive model may be constructed from data extracted or consumed from sets of issue records or issue requests that exist in the system and may, in some instances, be represented by a nodal graph or other interconnected or relational system.

In one specific example, a predictive model or predictive test model may be able to correlate the presence of the term "bug" in an issue request description and an issue type of "bug report." More specifically, in this example, the predictive text model can be configured to determine a statistical likelihood (e.g., a confidence value) that an issue request having a description including the term "bug" will also have the issue type of "bug report." Similarly, the predictive text model can be configured to determine a statistical likelihood that an issue request having the issue type of "bug report" will also include the term "bug" in the issue description.

In another specific example, a predictive model or predictive text model may be able to correlate an issue request title having a positive sentiment with an issue request type of "user story." More specifically, the predictive text model can be configured to determine a statistical likelihood that an issue request having a title having a positive sentiment (e.g., determined by any suitable sentiment analysis technique or method including, but not limited to, subjectivity/objectivity identification and tagging, feature extraction, lemmatized word polarity tagging, and so on) will also have the issue type of "user story." Similarly, the predictive text model can be configured to determine a statistical likelihood that an issue request having the issue type of "user story" will also have a title exhibiting a positive sentiment. For purposes of the following description, a "user story issue type" is an issue that generally relates to a desired functionality or enhanced feature that the user would like to see in a future version of the software program or application. In some cases, a set of user stories may relate to an epic or initiative. Accordingly, an "epic issue type" or "initiative issue type" may also be identified based on a statistical likelihood that an issue request includes analyzed content that indicated a positive sentiment.

In another example, a predictive text model may be able to correlate an issue request description having a negative sentiment with an issue request type of "bug report" or "software bug issue type." More specifically, the predictive text model can be configured to determine a statistical likelihood that an issue request having a title having a negative sentiment will also have the issue type of "bug report." Similarly, the predictive text model can be configured to determine a statistical likelihood that an issue request having the issue type of "bug report" will also have a description exhibiting a negative sentiment.

In some cases, the predictive model may be used to predict a complexity index or estimated time to complete a proposed issue request. Specifically, the predictive model may include or be based on a set of existing issue records that are associated with a specific assignee. As described herein, the term "assignee" may be used to refer to a person or team of persons that are responsible for at least a portion of an issue that is submitted to or being processed by the issue tracking system. In some cases, the system is configured to extract content from an issue request (whether complete or in the process of being entered by the user through a graphical user interface of a client application). Based on the extracted content, the system may be configured to determine one or more of: an assignee, a predicted or estimated time, and a modified or predicted complexity index. In yet another example, a predictive text model may be able to determinate a correlation between an issue request assigned to a particular user with an issue closure time estimation. In some cases, the closure time estimation includes a statistical analysis of previous closure times, including an average time, mean closure time, or other similar measure.

It may be appreciated that these foregoing examples are not exhaustive. Further, in view of the embodiments described herein, it may be appreciated that a predictive text model may be configured to operate differently in different embodiments and/or as a result of training on different issue record sets having different content.

More generally and broadly, it is understood that a predictive text model, such as described herein, can be configured to determine a statistical likelihood (e.g., output a confidence value or other metric) that a given content item (or partial content of a given content item) of an issue request or issue record is related to at least one other content item. Example content items that may be determined to be correlated by a predictive text model can include, but may not be limited to: title; description; summary; linked issue(s); tags; categories; assignee; reporter; project; and the like. In general, an assignee or project team may relate to a software development team that is responsible for all or some portion of the associated issue request or issue record. Further, a reporter or ticket issuer may relate to a person or entity that initiates a ticket or issue request.

Once a predictive text model is suitably trained on a given set of previously received issue records, the predictive text model can be leveraged by an issue tracking system to determine a likelihood that issue request content—or a portion thereof—submitted by a user presently interacting with the system is or is not expected to be related to other issue content. In these examples, if the determined likelihood satisfies a threshold (predetermined, variable, or otherwise), the issue tracking system can generate a suggestion to the user to submit or approve of additional or alternative content that can supplement the issue request presently being populated by the user.

For example, a user of an issue tracking system may begin adding content to an issue request that has yet to be submitted to the issue tracking system. For example, the user may begin by typing an issue title into a blank issue request template or field that is rendered on a graphical user interface generated by the issue tracking system. The graphical user interface may be displayed on a user or client device that is executing a client application of the issue tracking system. As the user types and/or edits the issue request title, the issue tracking system may extract content from one or more fields and may leverage a predictive text model to determine whether the title entered by the user, or a portion thereof, can be correlated to data in any other field of the blank issue request template. For example, the user may type an issue title of "customer does not receive email from specific address." As the user types this title, the issue tracking system can supply each subsequent word (or phrase or any other logical or selected string segmentation) to a predictive text model to determine whether the title content is known to be correlated to any other content. For example, the predictive text model may be configured to recognize (e.g., determine a likelihood or confidence value satisfying a threshold) that the phrase "does not" reflects a negative sentiment which is known to be correlated with an issue type of "bug report." In some examples, the predictive text model may be additionally configured to recognize that phrases semantically similar to the term "receive email" (e.g., determined via any suitable semantic similarity or comparison operation) are known to be correlated with an issue category of "internet message access protocol" or "IMAP." In some examples, the predictive text model may be additionally configured to recognize that the term "email" is known to be correlated to a project of "Email Server." In some examples, the predictive text model may be additionally configured to recognize that the term "email" in a phrase having negative sentiment is known to be correlated to a priority of "high."

In response to these, and potentially additional, statistical determinations made by the predictive text model, the issue tracking system can provide one or more suggestions to the user. For example, the issue tracking system can prepopulate a type field of the blank issue request template with "bug report," a category field of the blank issue request template with "IMAP," a project field of the blank issue request with "Email Server," and, additionally, a priority field of the blank issue request template with "high."

As a result of this construction, from the user's perspective, as the user types the issue title, additional content of the blank issue request template becomes automatically and/or autonomously populated with relevant content. In some embodiments, each suggestion for supplemental content provided by the issue tracking system may require approval by the user, but this is not required.

In still further examples, the issue tracking system can be configured to iteratively and/or recursively suggest supplemental issue request content to a user based on other previously recommended supplemental issue request content. For example, continuing the example introduced above, after populating the priority field of the blank issue request template with "high," the issue tracking system and/or the predictive text model may be configured to recognize that issues with "email" in the title that have a priority of "high" typically require eight hours to address. In response to this determination, the issue tracking system can prepopulate a time to completion estimation field of the blank issue request template with "eight hours." The time to completion estimate, in this case, is an example of a predicted or estimated time. In some implementations, a complexity index is used instead of, or in addition to, a measure of time.

These foregoing and other embodiments are discussed below with reference to FIGS. 1-6. However, those skilled in the art will readily appreciate that the detailed description given herein with respect to these figures is for explanatory purposes only and should not be construed as limiting.

FIG. 1 is a schematic representation of an example issue tracking system. In the illustrated embodiment, the issue tracking system 100 is implemented with a client-server architecture including a host service 102 that communicably couples (e.g., via one or more networking or wired or wireless communication protocols) to one or more client devices, one of which is identified as the client device 104. It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute an application (herein referred to as a "client application") stored, at least in part, in the memory 104b. The client application may be configured to produce a graphical user interface having a set of fields or other template for receiving user input regarding an issue request or ticket. The client application is configured to access and communicate with the host service 102 and to securely transact information or data with, and provide input(s) to, the host service 102 over a network. In some embodiments, the client application may be a browser application configured to access a web page or service hosted by the host service 102 that is accessible to the client device 104 over a private or public network that may, in some embodiments, include the open internet.

In many embodiments, the host service 102 is configured to operate within or as a virtual computing environment that is supported by one or more physical servers including one or more hardware resources such as, but not limited to (or requiring) one or more of: a processor; a memory; non-volatile storage; networking connections; and the like. As used herein, a processor of the host service 102 may refer one or more physical processors or processing units implemented on one or more physical computing system that, alone or together, can be configured to implement the functionality described herein. The host service 102 may be implemented on a single computing system or using a distributed network of computing systems. For simplicity of description and illustration, the various hardware configurations associated with a processor, computing device, or hardware architecture are not shown in FIG. 1.

In many embodiments, the host service 102 can include a number of discrete subservices or purpose-configured modules, containers, or virtual machines each configured to perform, coordinate, serve, or otherwise provide one or more services, functions, or operations of the host service 102, such as the operations of determining or inferring one or more patterns in issue record content, comparing issue request content to a previously-received issue request or record content, determining a likelihood that content of an issue request is related to other content of the issue request, and so on.

To facilitate these operations, the host service 102 includes an issue tracking server 106 configured to receive issue requests from the client device 104 via the network 105. As noted with respect to other embodiments described herein, an issue request—and/or portions or contents thereof—can be received from the client application 104*a* executed by the client device 104, the issue tracking server 106 can communicate with a predictive text model server 108 (abbreviated in the figure as the predictive text server) that is trained to perform an analysis on the content of issue requests received by the issue tracking server 106, whether complete or incomplete, to determine a likelihood that some content of the issue request entered by a user is correlated to other content that can be suggested by the predictive text model server 108.

As noted with respect to other embodiments described herein, the predictive text model server 108 of the host service 102 (example implementation of a "predictive model") can be trained, updated, and/or configured by analyzing content of (and/or any dependencies between) a set of issue records that corresponds to a set of issue requests previously received by the issue tracking system 100 and, in particular, the issue tracking server 106.

The set of issue records used to train the predictive text model server 108 can contain both issue records that have no relationship to other issue records and issue records that do have relationships to other issue records. In some cases, the predictive text model server 108 can weigh relationships ascertained between content in an issue record higher if that issue record is related to other issue records, but this is not required.

While training, iteratively or otherwise, the predictive text model server 108 can extract or consume user-supplied content (e.g., description, summary, title, categorization, project, team, assignee, reporter, and so on)—which is typically supplied in the form of a digital representation of text string—associated with each issue record of a given set of previously-received issue records (in turn corresponding to a set of issue requests received by the issue tracking system 100) to assemble a database or corpus of issue record contents. More specifically, the predictive text model server 108 can be configured to generate a directed or undirected graph, the nodes of which correspond to text content—and/or data derived therefrom, such as sentiment values—of one or more fields of an issue request or record and the edges of which correspond to statistical confidences that nodes connected by an edge are correlated to one another. In other examples, the edges of a graph constructed by the predictive text model server 108 can correspond to a similarity metric or value that corresponds to a likelihood that connected nodes appear in the same issue request or report. In some examples, an absence of an edge connecting two nodes can correspond to a positive signal that no relationship is predicted to exist between those nodes; although this is not required. The data structure or database that stores a graph constructed or updated by the predictive text model server 10 is referred to herein as the "correlation database."

In one embodiment, the predictive text model server 108 can consume ten (or some other number) previously received issue records. Among other content, four of the issue records in this example include the term "bug" in the title and six of the issue records in this example include the term "feature request" in the title. Of the four records that include the term bug in the title, three are assigned the type "Bug report" or "Software Bug." Of the six records that include the term "feature request" in the title, all six are assigned the type "User Story." In this simplified example, the predictive text model server 108 can determine that if a given issue request includes the term "bug" in its title, there exists a 75% likelihood that the same issue request will also be assigned the type "Bug Report." Similarly, in this simplified example, the predictive text model server 108 can determine that if a given issue request title include the term "feature request," there exists a 100% likelihood that the same issue request will also be assigned the type "User Story." In some cases, the user story will be part of a set of user stories that relate to a "User Epic" also referred to sometimes as simply an "Epic." Similarly, a user epic or an epic may be part of a set of epics that relate to an initiative. In some examples, the predictive text model server 108 can be configured to adjust or otherwise bias these confidence values based on sample size, although this is not required. These nodes and edges can be stored in a correlation database managed by, or otherwise in communication with, the predictive text model server 108.

In some implementations of this example, the predictive text model server 108 can be configured to generate a graph including a node corresponding to the term "bug" when used in a title, a node corresponding to the term "feature request" when used in a title, a node corresponding to the term "User Story" when used as an issue type, and a node corresponding to the term "Bug Report" when used as an issue type. These four nodes can be connected to one another by two edges—a first edge connecting the "Bug Report" node and the "bug" node and a second edge connecting the "User Story" node and the "feature request" node. The first edge can be assigned a magnitude or value of 75% and the second edge can be assigned a magnitude or value of 100%. These values and relationships can be stored in a correlation database accessible to the predictive text model server 108.

It may be appreciated the preceding example is not exhaustive; the predictive text model server 108 may ascertain any number of relationships between any number of content items or subdivisions thereof (e.g., terms, words, phrases, and so on) of an issue request that can be received by the issue tracking system 100. In further examples, the predictive text model server 108 can be further configured to add nodes and/or edges to the graph based on data derived from one or more content items or subdivisions thereof (e.g., terms, words, phrases, and so on). Data that can be derived from a content item of an issue request, such as described herein, can include, but may not be limited to: a semantic similarity to another content item; a sentiment score or analysis result; a topic model; a semantic root or lemmatization; and the like. Further, it may be appreciated that the predictive text model server 108 may perform differently and/or may ascertain different relationships between different content items after training in response to being supplied with different sets of issue records.

Example issue records that can be supplied to the predictive text model server 108 can include, but may not be limited to: previously opened issue records; previously closed issue records; issue records related to a project; issue records related to a particular epic; issue records related to a particular story; issue records related to a particular company or company type (e.g., software development corporation, human resources corporation, project management corporation); and so on.

Accordingly, generally and broadly, and as noted above, data and/or content extracted from one or more issue records that can be consumed by the predictive text model server 108 to train and/or define one or more operations of the predictive text model server 108 can include, but may not be limited to: issue title; issue description; issue summary; issue assignee; issue requester; issue links; issue relationships; issue dependencies; issue projects; issue tags, groups, clusters, or categorizations; and so on. In many cases, the predictive text model server 108 can further subdivide data and/or content extracted from a particular data item of a particular issue record by keyword, topic model (e.g., determined or obtained via Latent Dirichlet Allocation operation(s), Non-negative Matrix Factorization operation(s), and so on), phrase, and so on.

Regardless of training data and/or training methodology, the data extracted or consumed by the predictive text model server 108 can be analyzed (and, optionally, normalized, lemmatized, segmented, or otherwise preprocessed) to determine whether statistical inferences can be derived therefrom. For example, in one embodiment, text content derived from, or otherwise obtained from, a first content item known to be related to at least one other content item can be segmented by words, phrases, or sentences to determine which words or phrases occur most frequently together.

Although it is appreciated that the predictive text model server 108 can be trained and/or defined or configured to operate in any suitable manner, in many cases the predictive text model server 108 is trained by consuming historical issue record data stored in the issue tracking system 100.

In such examples, the predictive text model server 108 consumes a set of issue records stored by the issue tracking system 100 (e.g., all issue records stored, a subset of issue records stored, all issue records related to a particular project, and so on) and tallies the frequency of words or phrases as they appear in a particular field (e.g., title, description, summary, and so on) of an issue record. Thereafter, a subset of the most commonly appearing words or phrases (e.g., only those words or phrases that appear more frequently than a threshold value) for each field can be compared against other fields to determine whether a statistically relevant relationship can be inferred therefrom and stored in a correlation database.

Example sets of issue records (and content thereof) that can be used to train the predictive text model server 108 can include (without limitation): all issue records stored by the issue tracking system 100, regardless of client, epic, story, initiative, assignee, project, group, or otherwise; only issue records associated with a particular client or business; only issue records associated with a particular client or user type (e.g., large-cap companies, small-cap companies, software development companies, human resources companies, and so on); only issue records associated with a particular group of users (e.g., a particular software development group); only issue records associated with a particular project; only issue records associated with a particular product platform (e.g., Apple iOS® software project or Google Android® software product); and so on.

The preceding examples are not exhaustive; it may be appreciated that in some embodiments, training data supplied to, and consumed by, the predictive text model server 108 can be limited, curated, or otherwise tailored in any suitable manner. Alternatively, training data can be entirely unlimited and may span different users, different instances of different issue tracking systems, and so on. In different embodiments, different training data—or sets of training data—may be appropriate, preferred, or otherwise used.

For example, as noted above, the predictive text model server 108 can be configured to extract and/or consume content of an issue request as it is being entered by a user. More specifically, as a user enters content to a blank issue request template (e.g., one or more fields of a graphical user interface displayed by the display 104c of the client device 104) prior to submitting the issue request to the issue tracking system 100, the partially complete issue request content entered by the user can be received by the issue tracking system 100. In response, the predictive text model server 108 can extract keywords, perform a semantic analysis operation, perform a sentiment analysis, perform a text normalization operation (e.g., sentence segmentation, lemmatization, stop word removal, and so on), and/or perform one or more topic modeling operations to determine whether the content entered by the user is known to be related to other content yet to be entered by the user.

Thereafter, in these examples, the predictive text model server 108 can compare the resulting keywords, normalized text, semantic score, and/or topic models (collectively, herein "extracted features") of a particular given data field or content item to one or more entries in a correlation database accessible to the predictive text model server 108.

The predictive text model server 108 can compare extracted features to entries in a correlation database in any number of suitable ways. Examples include, but are not limited to, calculations and/or operations to determine: Levenshtein distance; cosine similarity calculation; Manhattan distance calculation; semantic similarity; lemmatized string similarity; term frequency comparison; document or field term frequency comparisons; Jaro-Winkler distance; Jaccard similarity; and the like.

In many cases, a comparison leveraged by the predictive text model server 108 can output a similarity value or score that can be compared against a similarity threshold to determine whether an extracted feature is sufficiently similar to an entry in a correlation database. It may be appreciated that such similarity thresholds can vary from embodiment to embodiment and from comparison technique or method to comparison technique or method. For example, a similarity threshold related to a Levenshtein distance calculation may be different from a similarity threshold related to a cosine similarity calculation. In some cases, extracted content from an issue request is used to identify an existing issue record having an issue type and content that corresponds to the extracted content.

Once a determination is made by the predictive text model server 108 that a particular extracted feature is sufficiently similar to one or more entries in a correlation database, the predictive text model server 108 can determine and output a statistical confidence or value that corresponds to a likelihood that the content submitted by the user is, or will be, related to other content in the same issue request. The likelihood may provide an indication that the determined related content may be appropriate for suggestion to the user.

Thereafter, the determined likelihood can be compared to a confidence threshold. Upon determining that the determined likelihood output from the predictive text model server 108 satisfies the confidence threshold—which may vary from embodiment to embodiment—the issue tracking system 100 can provide a recommendation to the user (e.g., via communication with the client device 104 over the network 105) of content that is related to the initial content entered by that same user.

More generally and broadly, it may be appreciated that the predictive text model server 108 can be trained to detect patterns and/or relationships between different features that can be extracted from different fields of an issue request or issue report. Once such patterns and/or relationships are ascertained by the predictive text model server 108, the relationships can be stored in a correlation database.

At a later time, in response to a user providing input to the issue tracking system 100 via the client device 104 across the network 105, the predictive text model server 108 can determine whether features extracted from the user input are related to previously extracted features stored in the correlation database.

Upon determining that a feature extracted from a particular data field of a particular issue request presently being submitted by the user is sufficiently related to an entry in the correlation database, the predictive text model server 108 can determine whether that entry is related to (e.g., satisfying a threshold) one or more other content items associated with other data fields. In response to this determination, the predictive text model server 108 can provide one or more recommendations to the user of supplemental content that may be added to the issue request presently being populated by that user. For example, the predictive text model server 108 may suggest an issue type, issue description, or other issue content to the user. The predictive text model server 108 may also suggest a time estimate, predicted time estimate, modified time estimate, complexity index, estimated complexity index, modified complexity index or other similar measure of task difficulty or completion time.

In another, non-limiting phrasing, embodiments described herein reference an issue tracking system, such as the issue tracking system 100, configured to consume input provided by a user in substantially real time. More specifically, as a user populates one or more data fields of a blank issue request template of a graphical user interface, the issue tracking system 100 can extract and supply the partially entered data to the predictive text model server 108 which can extract one or more features therefrom. Example extracted features include but are not limited to: keywords; phrases; semantic features; sentiment values; and the like. Once one or more features are extracted from the partial input provided by the user, the predictive text model server 108 can determine whether the extracted features are sufficiently related to an entry in a correlation database that stores a graph of nodes and edges correlating different extractable features of different fields of an issue request or report to one another. Upon determining that the extracted features match or correspond to at least one entry in the correlation database, the predictive text model server 108 can offer to the user a suggestion to enter additional or supplemental data based on one or more nodes or edges associated with the matched entry in the correlation database.

For example, a user of the issue tracking system 100 may begin populating a blank issue request template by supplying an issue description. As the user types, the issue tracking system 100 may provide the predictive text model server 108 with the text entered by the user. In response, the predictive text model server 108 may extract one or more features from the input provided by the user. Each feature extracted by the predictive text model server 108 can be compared to one or more entries in a correlation database accessible to the predictive text model server 108. In this example, the predictive text model server 108 may determine that a feature extracted from the description provided by the user is related to an entry (e.g., a node) in the correlation database. In turn, the entry in the correlation database can be determined by the predictive text model server 108 to be related to one or more additional entries in the same database which, in turn, can be used by the predictive text model server 108 to provide one or more recommendations to the user.

In one specific implementation of the preceding example, a user of the issue tracking system 100 can begin by populating an issue description of a blank issue template with the string "comment field does not work." As the user types this description, the issue tracking system 100 provides the predictive text model server 108 with the user's input. In this example, the predictive text model server 108 may extract two features from the input provided by the user—a first feature may be the term "comment field" and a second feature may be a negative sentiment analysis value. In response to these determinations, the predictive text model server 108 may access a correlation database to determine whether the phrase "comment field" when used in an issue description is related to an entry in the correlation database and, separately, whether a negative sentiment in an issue description is related to an entry in the correlation database. In this example, the predictive text model server 108 may determine that the phrase "comment field" is semantically related (in a manner satisfying a threshold) to an entry in the correlation database related to an extracted feature of "user input field." In addition, in this example, the predictive text model server 108 may determine that a negative sentiment expressed in an issue request description is an entry in the correlation database.

In response to these example determinations, the predictive text model server 108 may determine that the "user input field" entry in the correlation database is highly correlated to an issue priority of "high" and, additionally, that the negative sentiment expressed in an issue request description is highly correlated to an issue type of "Bug Report."

In response to these example determinations, the predictive text model server 108 may provide two recommendations to the user of the client device 104. A first recommendation may be to flag the issue request as "high" priority and a second recommendation may be to set the issue request type to "Bug Report." Alternatively, if extracted content is analyzed and determined to express a positive sentiment, an issue request type of "User Story," "User Epic," or "Initiative" may be associated with the issue request. The recommendations may be transmitted back to the user or client device and used to populate one or more fields of the graphical user interface.

It may be appreciated that the foregoing examples are not exhaustive. More generally and broadly, it is appreciated that the issue tracking system 100 and in particular the predictive text model server 108 of the issue tracking system 100 can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in, and/or logical or causal relationships between, different issue content(s) or fields, different extracted features, and so on.

More generally, it may be appreciated that the issue tracking system 100 may be configured to detect, define, determine, or otherwise infer one or more patterns in, without limitation: a history or log of content of issues reported to the system for a particular project or epic and/or categorized or grouped in a particular manner; the time between entry of different content in different issues having similar categorization or tags; text content of one or more issues reported to the system; issues reported by or assigned to a particular user of the system; issues related to a particular task or story associated with a particular project tracked by the system; and the like.

It may be appreciated, however, that any suitable means of determining a pattern or other logical or causal link between two or more fields or content items of an issue request or issue record can be used. For simplicity of description, these operations are described herein as operations to detect a pattern in, or apply machine learning to, content of issues previously reported to the issue tracking system 100.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, the issue tracking system 100 of FIG. 1 can be implemented in a number of suitable ways. As illustrated, the host service 102 includes one or more purpose-configured modules or components each configured to perform a discrete task associated with the operation of the issue tracking system 100.

In particular, as noted above, the host service 102 includes an issue tracking server 106 and a predictive text model server 108. It may be appreciated that although these functional elements are identified as separate and distinct "servers" that each include allocations of physical or virtual resources (identified in the figure as the resource allocations 106a and 108a, respectively)—such as one or more processors, memory, and/or communication modules (e.g., network connections, and the like)—that such an implementation is not required. More generally, it may be appreciated that the various functions described herein of a host service 102 can be performed by any suitable physical hardware, virtual machine, containerized machine, or any combination thereof.

In the illustrated example, the issue tracking server 106 of the host service 102 can be configured to manage and maintain a record of issues reported in one or more projects tracked by the issue tracking system 100. In addition, the issue tracking server 106 of the host service 102 can be configured to communicably couple to the client device 104 via the network 105 in order to exchange information with and/or receive input(s) from the client device 104 in the course of tracking and/or documenting progress of completion of one or more issues of one or more projects tracked by the issue tracking system 100.

Information or data related to projects tracked by the issue tracking system 100, such as a codebase of a software development project, can be stored, in many embodiments, in a database managed by a repository server (not shown), which can be communicably and securely coupled to the issue tracking server 106. The repository server may be used to store or maintain a repository of issue records, issue record groups, issue record clusters, and/or other data related to the creation and maintenance of issues. The database(s) managed by the repository server can be implemented with any suitable known or later developed database or digital information storage technology or technique. In many examples, the repository server is configured to track and maintain a record of changes made to data or information stored in the database(s) managed by the repository server, but this may not be required.

In many examples, the issue tracking server 106 can be configured to receive, over the network 105, from the client device 104 (e.g., via user input provided through a graphical user interface rendered on the display 104c, provided by the client application, or any combination thereof), an issue request.

The issue request may include, by way of example, a request to open, create, or report an issue in a particular project; a request to modify an existing issue; a request to close an existing issue; a request to link an existing issue to another issue; a request to assign an issue to a particular user; a request to initiate an operation to detect one or more patterns of issue recording (such as described herein); a request to initiate an operation to determine whether two or more issues are related; and the like. In some examples, in response to information or requests received from the client device 104, the issue tracking server 106 can submit a request to the repository server to add, modify, or delete data stored in one or more databases managed by the repository server.

In addition, the client device 104—and in particular, the client application executed by the client device 104—can be configured to receive, over the network 105, from the issue tracking server 106, without limitation: a suggestion of issue content to be added to an issue request; a notification that one or more content suggestions are available to a user for consideration; and so on. The client application on the client device 104 may be configured to extract and transmit content from one or more fields of the graphical user interface and, similarly, may receive and populate one or more fields in response to suggestions provided by the host service 102.

In still further examples, a predictive text model server (such as the predictive text model server 108) can be configured to dynamically generate one or more values to suggest to a user. For example, in one embodiment, an input provided by a user to a particular data field of an issue request can be analyzed by the predictive text model server to determine whether a feature of that input can be correlated to an estimation of complexity. For example, a predictive text model server can determine a correlation between use of the terms (or semantically related terms) "implement" and "authentication" in an issue description with a high complexity. In these examples, the predictive text model server can be further configured to ascertain that for issue records tracked by the issue tracking system with complexities of "high," the time to complete those issues is correlated with the number of child issues related to that issue (e.g., issues that depend from the "high complexity" issue). For example, the predictive text model server may determine that a "high" complexity issue having five children takes on average a longer period of time to complete than a "high" complexity issue having two children. In response, the predictive text model server can provide a recommendation to a user that modifies or biases an average time to completion by a certain amount based on this determination. Continuing the preceding example, the predictive text model server may provide a recommendation to a user that time to complete the issue request presently being populated by that user may require additional time. For example, if the average time for issue records semantically related to the issue request is known to be eight hours, the predictive text model server may recommend to the user to enter ten hours as a time estimation based, at least in part, on the determination that the issue has a high complexity. In general, the complexity or estimated complexity of an issue or task is measured as either a numerical complexity index (e.g., an integer number) or a relative complexity index (e.g., low complexity, medium complexity, high complexity, very high complexity).

In still further examples, the predictive text model server can be configured to provide an estimate of time-to-completion or time estimate based on a history of previously reported issue requests that are determined to be related to an issue presently being populated by a user. For example, as the user populates a blank issue request template, the predictive text model server can receive and/or extract one or more features from the user's partially entered issue request content. Thereafter, the predictive text model server can compare the extracted feature(s) to other features extracted from one or more previously received issue records (e.g., a set of existing issue records). If a correlation is found by the predictive text model server, the predictive text model server can suggest to the user to assign the complexity and time-to-completion extracted from the matched previously received issue. The complexity or time to completion may be represented by a time estimate and/or a complexity index. In some cases, the predictive text model server can be configured to average or determine another statistical measure of time, complexity, or time-to-completion from multiple matched previously received issues. In still further embodiments, a predictive text model server can be configured to determine a complexity, time estimate, and/or a time-to-completion estimation for a user using another analysis of previously entered or stored issue record content.

It may be appreciated that the foregoing examples are not exhaustive; more generally and broadly, it is appreciated the issue tracking server 106, the repository server, and the client device 104 can transact any suitable data or information, in any suitable form or format, across one or more communication channels or protocols, in a secure or encrypted manner, or in an unencrypted manner, and so on.

In view of the foregoing, it may be understood that the various descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
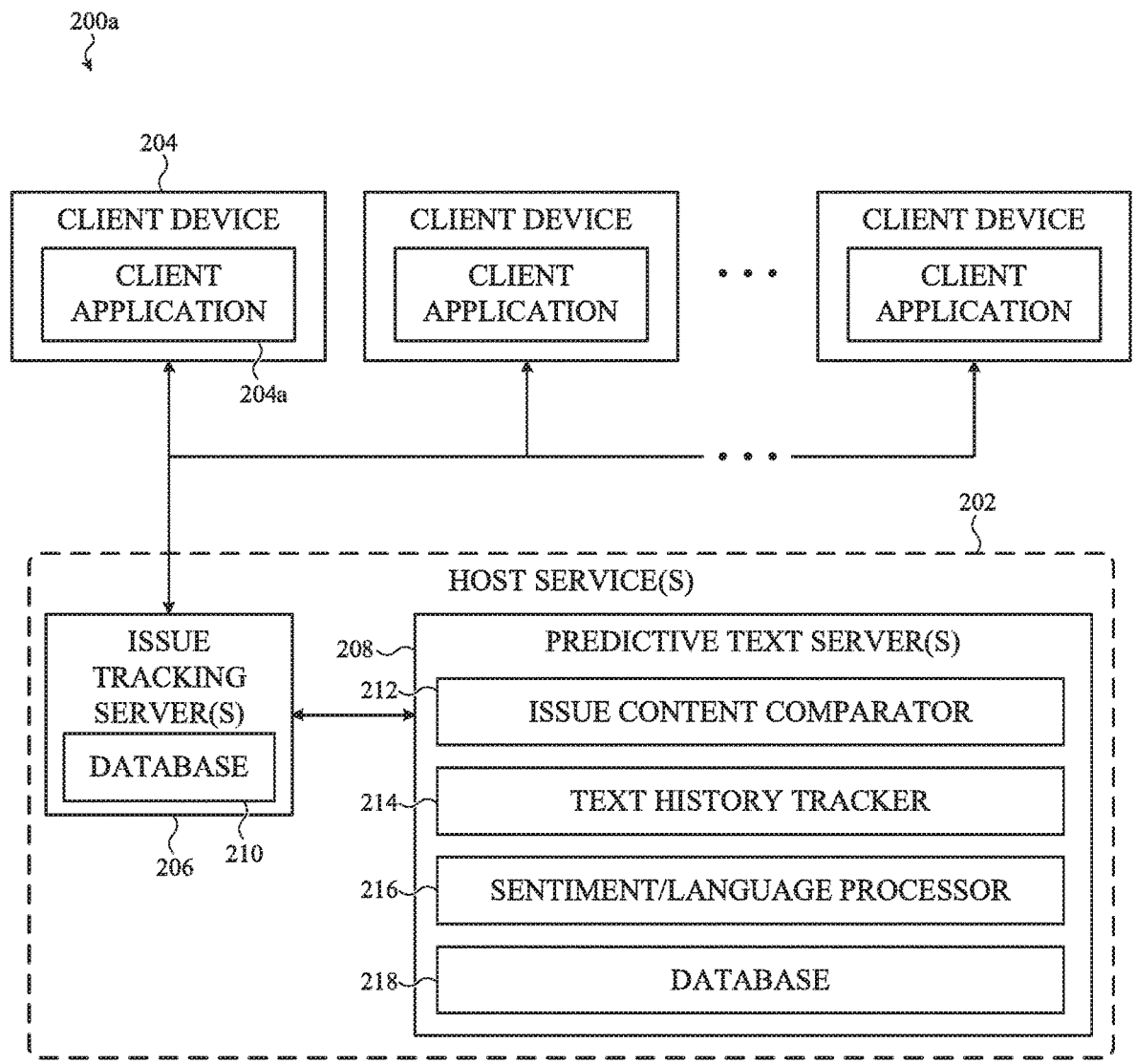
FIG. 2A is a system and signal flow diagram of an issue tracking system, such as described herein.

For example, FIG. 2A, depicts a system and signal flow diagram of an issue tracking system, such as described herein. The issue tracking system 200a can be configured, both physically and operationally, in the same manner as the issue tracking system 100 described in reference to FIG. 1 and this description is not repeated.

The issue tracking system 200a can include a host service 202 configured to communicate with one or more client devices, one of which is identified as the client device 204. As with other embodiments described herein, the client device 204 can be configured to execute a client application 204a that is configured to transact information and data with the host service 202. The client application 204a provides a graphical user interface to facilitate interaction between the issue tracking system 200a and a user of that system.

The host service 202 includes an issue tracking server 206 that is communicably coupled to a predictive text model server 208. As with other embodiments described herein, the issue tracking server 206 can include a database 210 or issue record repository that is configured to store information related to content of issues reported and closed for projects tracked by the issue tracking system 200a.

As with other embodiments described herein, the host service 202 also includes the predictive text model server 208. In the illustrated embodiment, the predictive text model server 208 can include a number of discrete subservices or purpose-configured modules, containers, or virtual machines each configured to perform, coordinate, serve, or otherwise provide one or more services, functions, or operations of the predictive text model server 208. More particularly, the predictive text model server 208 can include an issue content comparator 212, a text history tracker 214, a sentiment/language processor 216, and a database 218.

The issue content comparator 212 of the predictive text model server 208 can be configured in any suitable manner to implement the operation of comparing one or more issues, fields, or content items (e.g., extracted features) for similarity to one or more entries in a correlation database. As noted above, this operation can be performed in a number of ways. This description is not repeated.

The text history tracker 214 of the predictive text model server 208 can be configured in any suitable manner to implement or otherwise perform the operation of extracting features from a given input issue record or field to create an entry in a correlation database, such as described herein.

The sentiment/language processor 216 of the predictive text model server 208 can be configured in any suitable manner to implement or otherwise perform the operation of providing natural language processing and/or semantic or sentiment analysis of content of one or more issues or issue contents. In one example, the sentiment/language processor 216 can be leveraged by the issue content comparator 212 to compare the text content of two or more issues. In another example, the sentiment/language processor 216 can be leveraged by the issue content comparator 212 to determine whether two or more contents express the same or a similar sentiment. It may be appreciated that the sentiment/language processor 216 may be suitably configured for purpose-agnostic natural language processing and/or text or string comparisons.

The database 218 or issue content repository of the predictive text model server 208 can be configured in any suitable manner to implement or otherwise perform the operation of storing a correlation database, such as described herein. The database 218 can be accessed by any module or component of the predictive text model server 208 at any suitable time to determine whether a particular issue content item (or field) matches and/or otherwise corresponds to another issue content item or field.

It may be appreciated that the foregoing simplified examples are not exhaustive of the various possible components, systems, servers, and/or modules that may be used by an issue tracking system, such as described herein. Accordingly, more generally and broadly, it may be appreciated that an issue tracking system such as described herein can be configured to receive an issue request from a user, compare those issue requests or records to previously-detected issue requests, records or issue recording patterns, and provide recommendations of additional actions that can be taken by the user based on a determined similarity between the newly-received issue request and one or more previously reported issues or one or more previously-detected issue recording patterns.

Figure 2B:
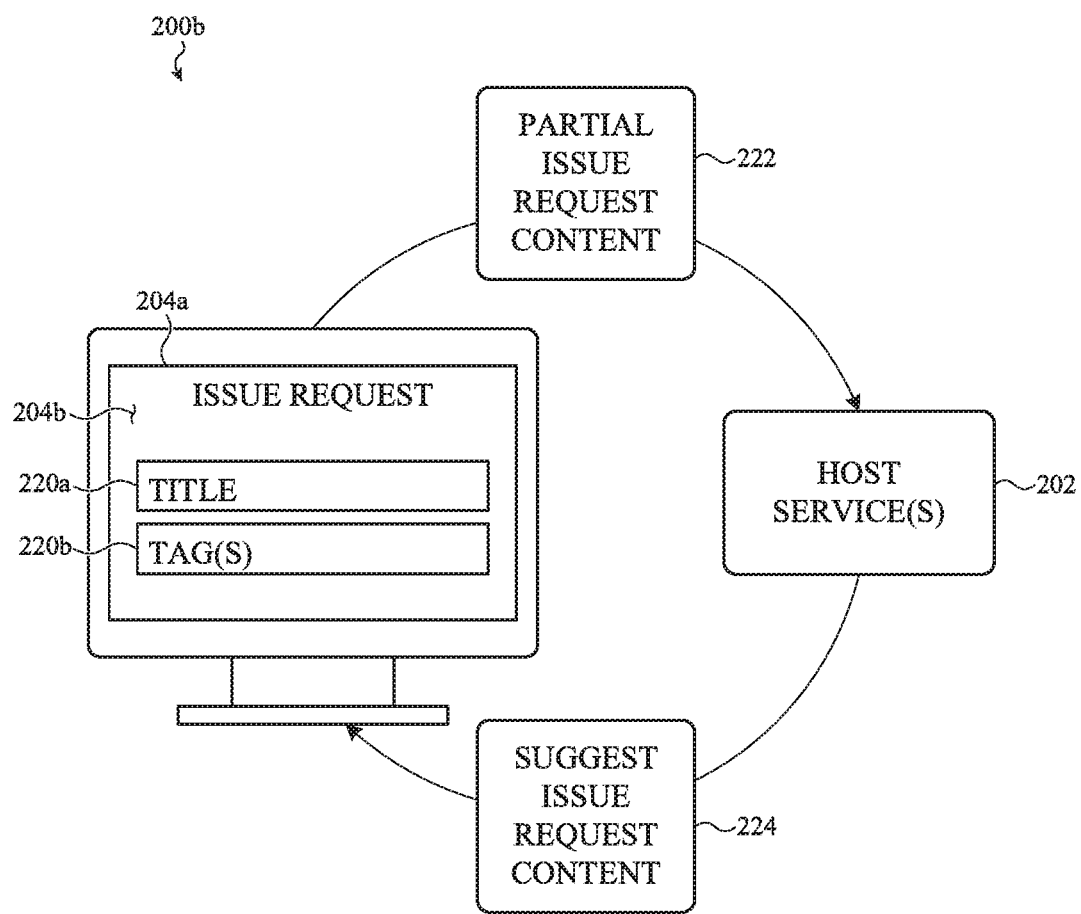
FIG. 2B is a signal flow diagram of an issue tracking system suggesting issue content, such as described herein.

For example FIG. 2B depicts an example signal flow diagram depicting communications between a client application operating on a client device and a host service of an issue tracking system, such as described herein. More specifically, as with the embodiment depicted in FIG. 2A, the issue tracking system 200b includes a host service 202 in communication with a client device 204. The client device 204 can execute an instance of a client application 204a. The client application 204a can render a graphical user interface 204b. The graphical user interface 204b can be used by a user to submit one or more issue requests (and/or to generate one or more issue records) to the host service 202. More specifically, the graphical user interface 204b can render one or more data entry fields, such as the data entry fields 220a, 220b illustrated in the figure, which can receive data entered by a user.

In one specific implementation of this example embodiment, a user can operate the graphical user interface 204b of the client application 204a to enter data into either or both of the data entry fields 220a, 220b to generate partial issue request content 222 for an issue request tracked by the issue tracking system 200b that can be submitted to the host service 202. In response to receiving the issue request 222, the host service 202—or, more precisely, a predictive text model server or service of the host service 202 (see, e.g., FIG. 2A)—can perform one or more operations. For example, the host service 202 can determine whether the partial issue request content 224 includes an extractable feature related to one or more entries in a correlation database accessible to the predictive text model server that, in turn, are related to other issue request features. Upon making this determination, the predictive text model server can suggest to the user of the client application 204a one or more additional content items to include in the issue request currently being populated by that user.

As a result of this configuration and construction, the user of the client application 204b may save substantial time when entering data or content related to an issue; as the user enters information, additional related information can be prepopulated without the user's input.

The foregoing embodiments depicted in FIGS. 1—2B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although many embodiments reference a predictive text model server configured to compare issues and issue content in order to determine a likelihood that a given issue content item is related to at least one additional issue content item, this may not be required.

Generally and broadly, FIGS. 3-6 depict flow charts corresponding to example simplified methods of operating a system, such as described herein, to profile and/or monitor power consumption in a virtual computing environment.

Figure 3:
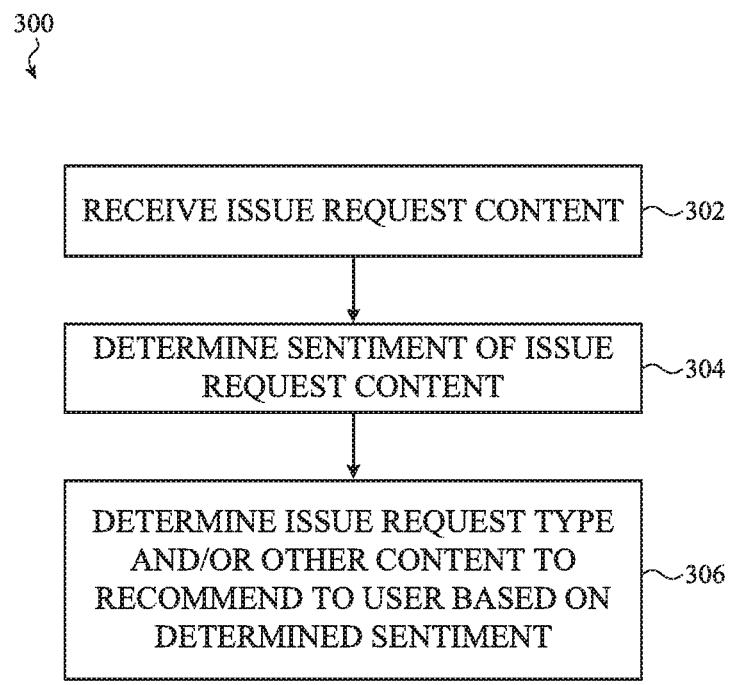
FIG. 3 is a flow chart that depicts example operations of a process of suggesting issue content in an issue tracking system, such as described herein.

FIG. 3 is a flow chart that depicts example operations of a process of suggesting issue content in an issue tracking system, such as described herein. The process 300 can be performed by any suitable hardware, whether virtual or physical, such as described herein. In many examples, the process 300 is performed by a predictive text model server, such as described herein.

The process 300 includes operation 302 in which issue request content is received. As noted with respect to other embodiments described herein, issue request content can be partial or complete. More specifically, issue request content can be related to a particular issue request field (e.g., title, description, summary, and so on). In some cases, operation 302 includes extracting content from one or more fields of a graphical user interface being displayed on a user or client device. In this regard, the process 300 may be performed using content that is partially entered or actively being entered by the user.

Once the issue request content is received at operation 302, the process 300 can advance to operation 304 in which a sentiment analysis is performed on one or more words, phrases, or extracted features of the received issue request content. The sentiment analysis performed at operation 304 can invoke or leverage any suitable algorithm or technique. In one example, a dictionary or database of terms or phrases including sentiment scores can be used to generate a net or sum score for a phrase or word received at operation 302. In other examples, text content received at operation 302 can be lemmatized or otherwise simplified or normalized. Thereafter, a text classification operation can be performed to classify a sentiment of each word or phrase of the content received at operation 302.

Once semantic analysis has been performed at operation 304, the process 300 can advance to operation 306 in which an issue request type can be determined based on the sentiment determined at operation 304. In one example, a positive sentiment determined at operation 304 may result in an issue type of "User Story," "User Epic," and/or "Initiative." In another example, a negative sentiment determined at operation 304 may result in a determined issue type of "Bug Report" at operation 306.

As noted with respect to other example embodiments described herein, any suitable sentiment value (e.g., a result of a sentiment analysis) can be associated with any suitable issue content. The preceding example of determined sentiment being associated with issue type is merely one example.

Figure 4:
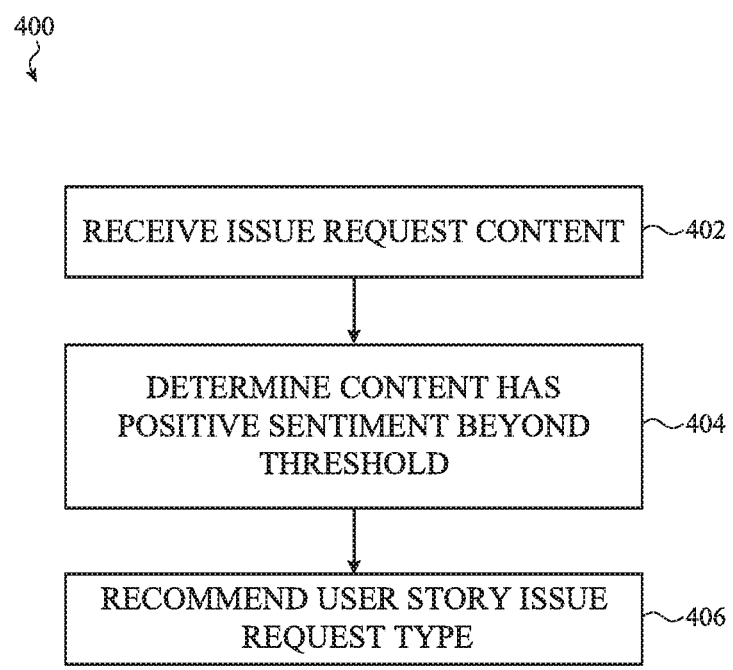
FIG. 4 is a flow chart that depicts example operations of a process of suggesting issue type in an issue tracking system, such as described herein.

FIG. 4 is a flow chart that depicts example operations of a process of suggesting issue type in an issue tracking system, such as described herein. Similar to the process 300 depicted in FIG. 3, the process 400 includes operation 402 in which an issue request content is received. Next, at operation 404, the process 400 may determine that the content received at operation 402 (whether that content relates to an issue request title, description, summary or any other suitable field) is associated with a positive sentiment satisfying a threshold.

Upon determining at operation 404 that the issue request content received at operation 402 exhibits a positive sentiment satisfying a threshold (which may vary from embodiment to embodiment), the process 400 can advance to operation 406 in which an issue type of "User Story" is recommended to a user. In some implementations, an issue type of "User Epic" and/or "Initiative" may be recommended to a user.

Figure 5:
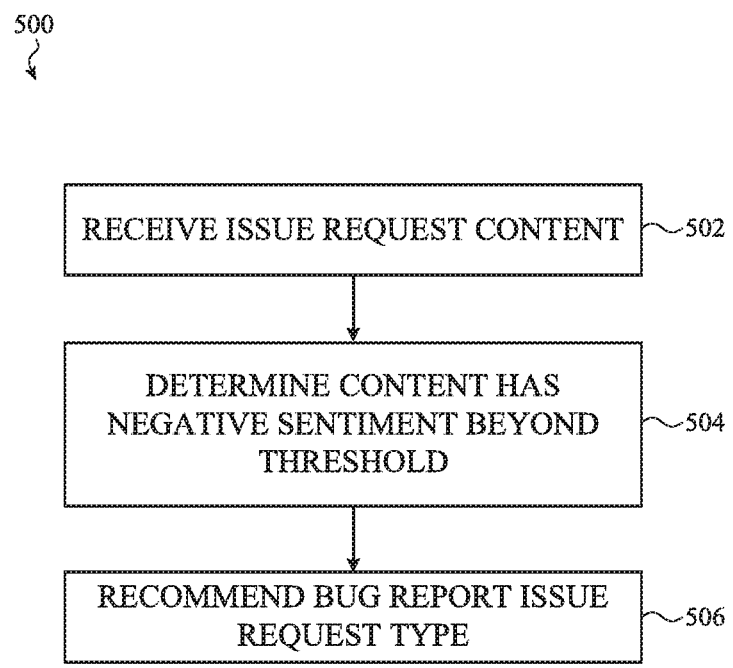
FIG. 5 is a flow chart that depicts example operations of another process of suggesting issue type in an issue tracking system, such as described herein.

FIG. 5 is a flow chart that depicts example operations of another process of suggesting issue type in an issue tracking system, such as described herein. Similar to the process 300 depicted in FIG. 3, the process 500 includes operation 502 in which an issue request content is received. Next, at operation 504, the process 500 may determine that the content received at operation 502 (whether that content relates to an issue request title, description, summary, or any other suitable field) is associated with a negative sentiment beyond a threshold.

Upon determining at operation 504 that the issue request content received at operation 502 exhibits a negative sentiment satisfying a threshold (which may vary from embodiment to embodiment), the process 500 can advance to operation 506 in which an issue type of "Bug Report," "Bug," or "Software Bug" is recommended to a user.

Figure 6:
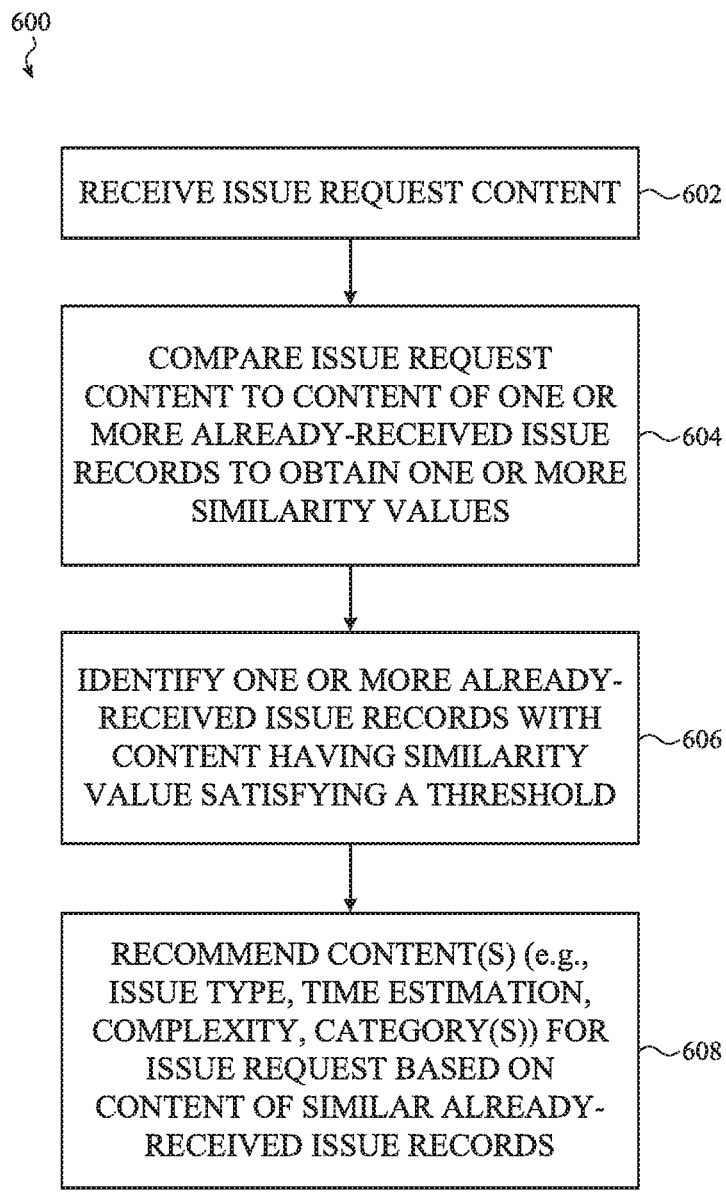
FIG. 6 is a flow chart that depicts example operations of a process of suggesting issue content in an issue tracking system, such as described herein.

Still further processes may be performed in whole or in part by a system or apparatus such as described herein. For example, FIG. 6 is a flow chart that depicts example operations of a process of suggesting issue content in an issue tracking system, such as described herein.

The process 600 includes operation 602 in which an issue request content is received and/or extracted. Next, at operation 604, the process 600 compares the issue request content received to content of one or more already-received issue records to obtain one or more similarity values therebetween. Operation 604 may identify an existing issue record using a predictive model, in accordance with embodiments described herein.

Next, at operation 606, the process 600 can identify one or more already-received issue records having content with similar (e.g., satisfying a threshold) content to the content received at operation 602. In one example, an issue record is identified having an issue type and/or one or more content items that correspond to content that was extracted from the issue request. Operations 604 and 606 may identify an existing issue record using a predictive model, in accordance with embodiments described herein. In some implementations, operations 604 and 606 are combined and/or are performed in an iterative manner. For example, using a predictive model, a host service may identify multiple potentially related or matching existing records and a similarity score or other criteria may be computed for multiple matches or identified records to determine a closest or sufficiently close relationship.

Finally, at operation 608, the process 600 can recommend one or more contents (such as an issue type, an issue title, an issue time estimation, an issue complexity, an issue category, and the like) based on the issue records or content identified at operation 606. In operation 608, suggested content may be transmitted back to the user or client device and, in some implementations, the suggested content is used to auto-populate one or more fields of the graphical user interface being displayed on the user or client device.

In one example implementation, the issue tracking system causes a display of a graphical user interface on a client device. The graphical user interface may be generated by a client application of the issue tracking system and may include a set of fields that receive user input. The client application may be configured to generate an issue request that includes some or all of the user input entered into the fields of the graphical user interface.

In some cases, a host service is configured to extract content from the fields being filled in by the user. In particular, the host service may extract content (e.g., user input) while the issue template is being completed and/or before the issue request is initiated. In some cases, the host service extracts content from a completed or submitted issue request. The extracted content is then transmitted to the host service via a network.

The host service, in some implementations may be adapted to determine an issue type based on the content extracted or received from the client device. In accordance with the examples provided herein, the host service may perform a sediment analysis or otherwise determine if the content indicates either a positive sentiment or a negative sentiment. The determination may be binary or, in some cases, the determination may result in a scaled or numeric representation of a degree of positive or negative sentiment. In some cases, the determination is made on a single item of content (e.g., an issue description) and in other cases, the determination is made using multiple items of content (e.g., an issue description and an issue title).

The host service may be configured to identify an existing issue record stored by the host service. In accordance with the embodiments described herein, the host service may use a predictive model to identify one or more existing issue records based on the one or more issue records having an issue type that corresponds to the issue type of the issue request and having at least one content item that corresponds to content extracted from the issue request. In some cases, the host service may extract content item the identified issue record and use the extracted content to suggest one or more content items to the user. For example, one or more of, an issue description, an issue title, an assignee, a complexity index, a time estimate, or other type of suggested content may be transmitted back to the client application. In some implementations, the suggested content may be used to auto-populate one or more fields of the graphical user interface.

In another example, the client application the graphical user interface may include multiple fields including: an issue type field; an issue description field; and a time or complexity index field. The host service may be configured to extract text from one or more of the fields and, using a predictive model, identify a previously stored issue request (or set of previously stored issue requests). The previously stored issue request may have an issue description, an issue complexity index, and/or a time estimate.

The host service may be configured to determine a predicted complexity index based, at least in part, on the complexity index of the issue record and the issue description of the issue request. The predicted complexity index may be represented by a time estimate and may be transmitted back to the client device. In some cases, the user has already entered a time estimate or complexity index and the system is configured to compute a modified time estimate or complexity index based on the predicted complexity index or time estimate alone or in combination with the user-entered time estimate or complexity index.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that the embodiments described herein relate generally to systems and processes for suggesting content to a user to add to an issue request that the user is presently engaged in populating prior to sending that issue request to the issue tracking system. The suggestions provided by the issue tracking system are based, in many examples, on an output of a predictive text model server.

Accordingly, one may appreciate that although many embodiments are disclosed above, that the operations and steps presented with respect to processes and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. A computer-implemented method of suggesting issue content to a user of a networked issue tracking system, the computer-implemented method comprising:
   causing a display of a graphical user interface on a client device running a client application of the networked issue tracking system;
   extracting a first content item from a first issue request field of the graphical user interface, the first issue request field pertaining to a first issue request and the first content item including text extracted from an issue description of the first issue request;
   transmitting the first content item from the client device to a host service;
   determining a first issue type based, at least in part, on the text extracted from the issue description;
   determining a nodal graph having a plurality of nodes representing a plurality of content items associated with issue records stored by the host service, wherein an edge between any pair of nodes represents a relational metric between respective content items represented by respective nodes in the pair of nodes;
   analyzing the nodal graph to determine a sentiment between the text extracted from the issue description and a first existing node of the nodal graph representing a second content item associated with an issue record of the first issue type;
   in accordance with the sentiment satisfying a criteria, obtaining a second existing node having an edge relationship with respect to the first existing node;
   using the second existing node, identifying at least one assignee or a project of an existing issue of the networked issue tracking system; and
   causing display of the at least one assignee or the project of the existing issue in a field of an issue request graphical user interface on the client device.

2. The computer-implemented method of claim 1, wherein the first issue type is one of: a bug report, a user story, an epic story, or an initiative.

3. The computer-implemented method of claim 2, wherein the first issue type is determined based on a sentiment analysis of at least the first content item.

4. The computer-implemented method of claim 3, wherein:
   in response to the sentiment analysis indicating a positive sentiment, the first issue type is determined to be the user story, the epic story, or the initiative; and
   in response to the sentiment analysis indicating a negative sentiment, the first issue type is determined to be the bug report.

5. The computer-implemented method of claim 1, further comprising:
   determining an assignee based, at least in part, on the first issue type and a project description extracted from the graphical user interface.

6. The computer-implemented method of claim 5, further comprising:
   identifying a set of issue records that is associated with the assignee;
   determining a complexity estimate based, at least in part, on the set of issue records;
   transmitting one or more of:
      the complexity estimate or a time estimate that is based on the complexity estimate to the client device, the time estimate predicting an amount of time required to complete the first issue request; and
   causing a display of one or more of: the complexity estimate or the time estimate.

7. The computer-implemented method of claim 1, further comprising:
   receiving a first time estimate or a first complexity estimate from the client device;
   identifying a set of issue records that corresponds to the first issue request;
   determining a modified complexity estimate based, at least in part, on the set of issue records and the first time estimate;
   transmitting one or more of:
      the modified complexity estimate or a modified time estimate that is based on the modified complexity estimate to the client device, the modified time estimate predicting an amount of time required to complete the first issue request; and
   causing a display of one or more of: the modified complexity estimate or the modified time estimate.

8. A networked issue tracking system for tracking issue records and suggesting content to a user, the networked issue tracking system comprising:
   a client device executing a client application that provides a graphical user interface; and a host service communicably coupled to the client application of the client device over a network and comprising a processor configured to:
receive, from the client application, a first content item extracted from a first issue request field of the graphical user interface, the first issue request field pertaining to a first issue request and the first content item including text extracted from an issue title or an issue description of the first issue request;
determine a first issue type based at least in part on the text extracted from the issue title or the issue description;
determine a nodal graph having a plurality of nodes representing a plurality of content items associated with issue records stored by the host service, wherein an edge between any pair of nodes represents a relational metric between respective content items represented by respective nodes in the pair of nodes;
analyze the nodal graph to determine a similarity between the text extracted from the issue title or the issue description and a first existing node of the nodal graph representing a second content item associated with an issue record of the first issue type;
in accordance with the similarity satisfying a criteria, obtain a second existing node having an edge relationship with respect to the first existing node;
using the second existing node, identify at least one assignee or a project of an existing issue of the networked issue tracking system; and
cause display of the at least one assignee or the project of the existing issue in a field of an issue request graphical user interface on the client device.

9. The networked tracking system of claim 8, wherein:
the first issue request field is a description field that contains a description of a first issue to be addressed by the first issue request; and
the processor of the host service is further configured to analyze the description of the first issue request to determine a statistical likelihood that the description indicates either a positive sentiment or a negative sentiment with respect to a node of the nodal graph.

10. The networked tracking system of claim 9, wherein:
in response to the analysis of the description indicating the negative sentiment, determining that the first issue type is a bug report that relates to a software problem to be fixed; and
in response to the analysis of the description indicating the positive sentiment, determining that the first issue type is a user story issue type that relates to a software function to be added or enhanced to a software program.

11. The networked tracking system of claim 9, wherein:
the host service determines the statistical likelihood that the description indicates either the positive sentiment or the negative sentiment by performing one or more of:
subjectivity term identification;
objectivity term identification;
textual feature extraction; or
lemmatized word polarity tagging.

12. The networked tracking system of claim 8, wherein:
the at least one assignee relates to a software development team that is responsible for the first issue request; and
the at least one assignee is transmitted to the client application and entered into an assignee field of a first issue request interface.

13. The networked tracking system of claim 8, wherein:
the host service is further configured to determine an issue complexity based on content extracted from the first issue request; and
the host service is configured to determine a time estimate based on the issue complexity, the time estimate predicting how much time the user may require to complete the first issue request.

14. The networked tracking system of claim 13, wherein:
the issue complexity is determined, in part, based on a complexity of the existing issue.

15. The networked tracking system of claim 8, wherein:
the host service is configured to receive a first issue complexity from the client device;
the host service is configured to determine an estimated issue complexity based on a set of issue complexities associated with a set of issue records stored by the host service; and
the host service is configured to transmit the estimated issue complexity to the client device.

16. A networked issue tracking system for tracking issue records and providing suggested issue content to a user, the networked issue tracking system comprising:
a client device executing a client application of the networked issue tracking system, the client application providing a graphical user interface for receiving a first issue request having a first issue type, a first issue description, and a first time or complexity index, the graphical user interface comprising:
an issue type field;
an issue description field; and
a time or complexity index field; and
a host service communicably coupled to the client application of the client device over a network and configured to:
receive from the client application the first issue description extracted from the issue description field;
using a predictive model constructed from a data set that includes previously submitted issue requests and previously stored issue records, determine a nodal graph having a plurality of nodes representing a plurality of content items associated with issue records stored by the host service, wherein an edge between any pair of nodes represents a relational metric between respective content items represented by respective nodes in the pair of nodes;
analyze the nodal graph to determine a similarity between the first issue description extracted from the issue description field and a first existing node of the nodal graph representing a content item associated with a previously stored issue record;
in accordance with the similarity satisfying a criteria, obtain a second existing node having an edge relationship with respect to the first existing node;
using the second existing node on the nodal graph, identify another issue record having a second issue description and a second time or complexity index;
determine a predicted time or complexity index based, at least in part, on the second time or complexity index and the first issue description, the predicted time index corresponding to a prediction of how much time the user may require to complete the first issue request and the predicted complexity index corresponding to a prediction of complexity of the first issue request; and
cause a display of the predicted time or complexity index on the graphical user interface of the client device.

17. The networked issue tracking system of claim 16, wherein:
the predicted time or complexity index is determined based, at least in part, on the first issue type extracted from the issue type field.

18. The networked issue tracking system of claim 16, wherein the predictive model includes a regression analysis performed on data extracted from the previously submitted issue requests and the previously stored issue records.

19. The networked issue tracking system of claim 18, wherein the regression analysis is used to determine the predicted time or complexity index.

20. The networked issue tracking system of claim 18, wherein the regression analysis is used to determine the first issue type.

\* \* \* \* \*